Figure 4:
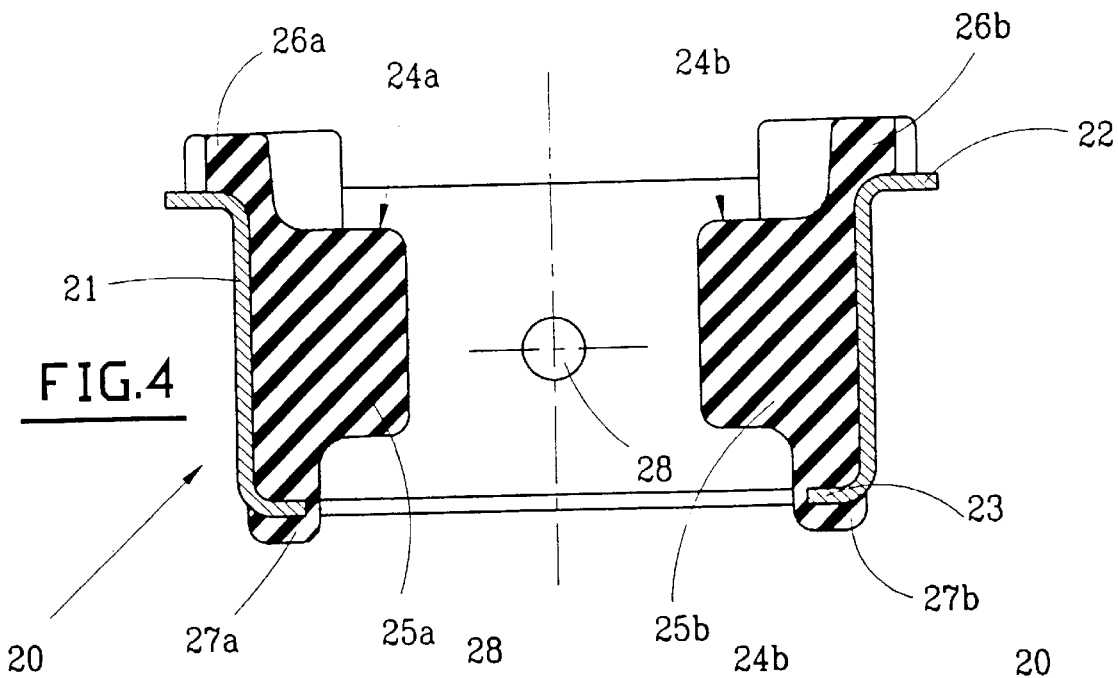

United States Patent [19]
Lefol

[11] Patent Number: 5,899,431
[45] Date of Patent: May 4, 1999

[54] ELASTIC ARTICULATION ESPECIALLY FOR A MOTOR VEHICLE WHEEL AND AXLE ASSEMBLY

[75] Inventor: Marcel Lefol, Domloup, France

[73] Assignees: Automobiles Peugeot, Paris; Automobiles Citroen, Neuilly Sur Seine, both of France

[21] Appl. No.: 08/608,145

[22] Filed: Feb. 28, 1996

[30] Foreign Application Priority Data

Feb. 28, 1995 [FR] France .................. 95 02320

[51] Int. Cl.$^6$ .................. F16M 13/00; F16F 7/00
[52] U.S. Cl. .................. 248/635; 248/638; 267/140.3; 267/141.1
[58] Field of Search .................. 248/615, 634, 248/622, 635, 632, 638, 636; 267/153, 293, 294, 140.3, 141.1, 141.2, 141.3, 141.4, 141.5, 140.4

[56] References Cited

U.S. PATENT DOCUMENTS

| 4,711,423 | 12/1987 | Popper | 248/638 |
| 5,014,474 | 5/1991 | Fyfe et al. | 248/634 |
| 5,096,153 | 3/1992 | Seeley et al. | 248/635 |
| 5,158,269 | 10/1992 | Hein et al. | 248/635 |
| 5,201,155 | 4/1993 | Shimoda et al. | 248/634 |
| 5,456,047 | 10/1995 | Dorka | 248/638 |
| 5,516,176 | 5/1996 | Kimoto et al. | 248/635 |

FOREIGN PATENT DOCUMENTS

| 0 131 795 | 1/1985 | European Pat. Off. . |
| 0 412 863 | 2/1991 | European Pat. Off. . |
| 31 08 701 | 9/1982 | Germany . |
| 35 36 284 | 4/1987 | Germany . |
| 36 35 612 | 5/1987 | Germany . |
| 40 10 378 | 10/1991 | Germany . |
| 2 010 438 | 6/1979 | United Kingdom . |
| 2 018 948 | 10/1979 | United Kingdom . |

OTHER PUBLICATIONS

Patent Abstracts of Japan, vol. 010, No. 062 (M–460), Mar. 12, 1986 & JP–A–60 208650 (Toukai Gomu Kogyo KK; Others: 01), Oct. 21, 1985.
Patent Abstracts of Japan, vol. 013, No. 373 (M–861), Aug. 18, 1989 & JP–A–01 126447 (Kinugawa Rubber Ind. Co. Ltd.), May 18, 1989.

Primary Examiner—Richard M. Lorence
Assistant Examiner—Matthew A. Kaness
Attorney, Agent, or Firm—Burns Doane Swecker & Mathis, L.L.P.

[57] ABSTRACT

An elastic articulation including an element for damping out the vertical and longitudinal deflections and an element for filtering out the low amplitudes, independent of and coaxial with the damping element. The filtering element and the damping element are capable of moving one with respect to the other.

12 Claims, 4 Drawing Sheets

U.S. Patent    May 4, 1999    Sheet 1 of 4    5,899,431
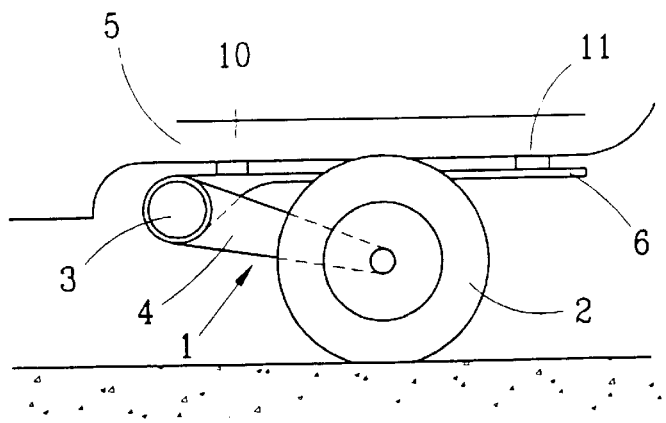
FIG.1
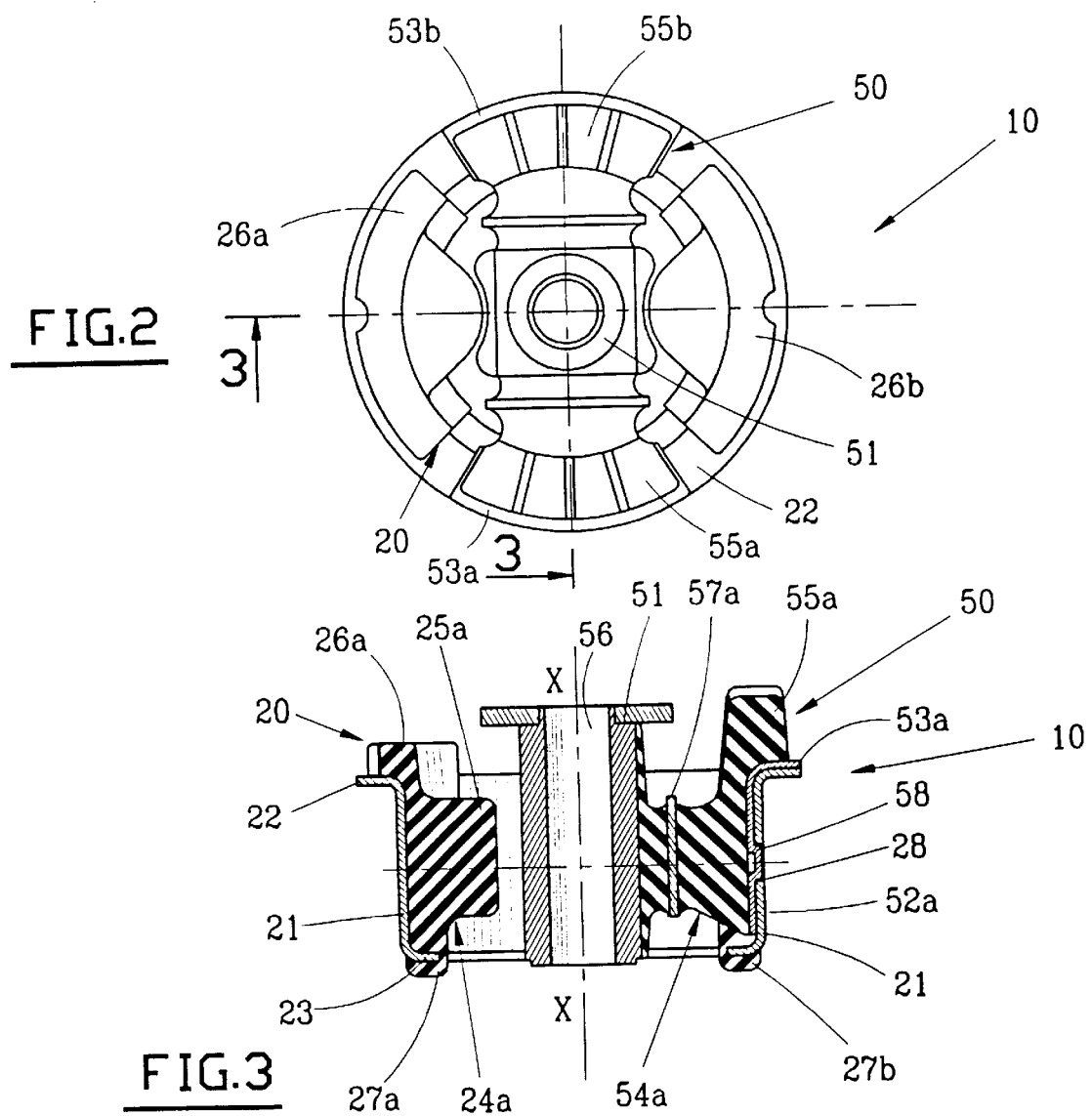
FIG.2
FIG.3

ELASTIC ARTICULATION ESPECIALLY FOR A MOTOR VEHICLE WHEEL AND AXLE ASSEMBLY

The subject of the present invention is an elastic articulation especially for mounting a motor vehicle wheel and axle assembly.

The wheel and axle assemblies of motor vehicles, and especially the rear axles are linked to the body of the vehicle by elastic articulations.

In general, two elastic articulations are arranged symmetrically on either side of the longitudinal axis of the motor vehicle.

The elastic articulation does not have to have the same elastic stiffness in all directions Indeed, in order to obtain good filtering of the vibration transmitted by the wheel and axle assembly to the body of the vehicle it is necessary for the articulation to have the lowest possible stiffness in the longitudinal direction.

The stiffness in the vertical direction has to be compatible with the load of the body of the vehicle that the articulation supports.

By contrast, the greatest possible stiffness is required in the transverse direction in order to provide transverse guidance for the wheel and axle assembly with respect to the body of the vehicle.

The elastic articulations used hitherto include a cylindrical external reinforcing member and a coaxial internal reinforcing member which are linked together by a block made of elastomeric material and capable of moving one with respect to the other.

To increase the elastic stiffness of the articulation in the transverse direction, at least one buffer block is arranged between two opposing portions and substantially in parallel with the axis of the articulation, of the external reinforcing member and the internal reinforcing member respectively.

However, this sort of elastic articulation is particularly complicated and forms a single-piece assembly which does not allow effective filtering out of the low-amplitude movements.

The object of the invention is to provide an elastic articulation making it possible to overcome the drawbacks mentioned hereinabove.

The subject of the invention is therefore an elastic articulation especially for mounting a motor vehicle wheel and axle assembly, characterized in that it includes an element for damping out the vertical and longitudinal deflections and an element for filtering out the low amplitudes, independent of and coaxial with the damping element, it being possible for the two elements to move one with respect to the other.

According to other features of the invention:

the damping element and the filtering element are fitted one inside the other and each include two symmetric and opposite blocks of elastomeric material arranged alternately and at 90° from one another, the damping element comprises an external metal reinforcing member forming a ring equipped with an upper flange directed towards the outside of the ring and with a lower flange directed towards the inside of the said ring and in which there are fixed the two blocks of elastomeric material, each one covering an opposite angular sector of the said ring, each block including a central mass extended at its upper part by a pad partially covering the upper flange and at its lower part by a pad partially covering the lower flange, the external reinforcing member of the damping element is made of steel, the filtering element comprises a central metal core and two opposing outer metal reinforcing members which are sector-shaped on the outside and at their upper part include a collar, the said core and the said reinforcing members being linked together by the two blocks of elastomeric material each of which includes a bearing stop covering the corresponding collar, the outside diameter determined by the two reinforcing members of the filtering element is slightly greater than the inside diameter of the ring of the damping element in order to obtain a precompression of the two blocks of elastomeric material of the filtering element, the central core and the two reinforcing members of the filtering element are made of steel, the central core is formed by a tube, each block of elastomeric material of the filtering element includes an intermediate lamination, the articulation includes means for positioning and for locking the damping element within the filtering element which are formed by two diametrically opposite radial holes made in the ring of the filtering element and by two diametrically opposite bumps made on the external faces of the outer reinforcing members of the damping element, the two bumps being intended to penetrate the two holes when the filtering element is fitted inside the damping element, the elastomer of the blocks of the damping element has a different rigidity from the elastomer of the blocks of the filtering element, the elastomer of the blocks of the damping element consists of a synthetic rubber, the elastomer of the blocks of the filtering element consists of a mixture comprising natural rubber and additives.

Figure 5:
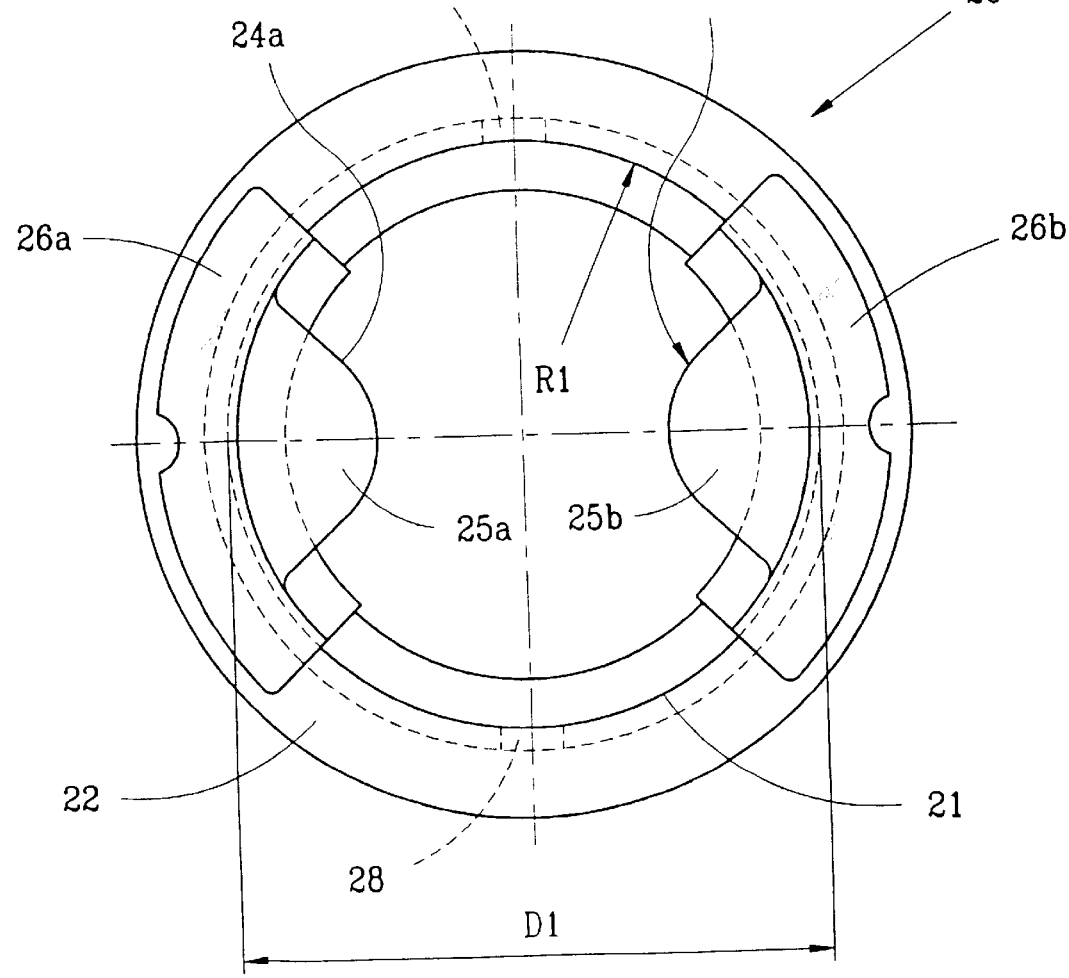
Figure 6:
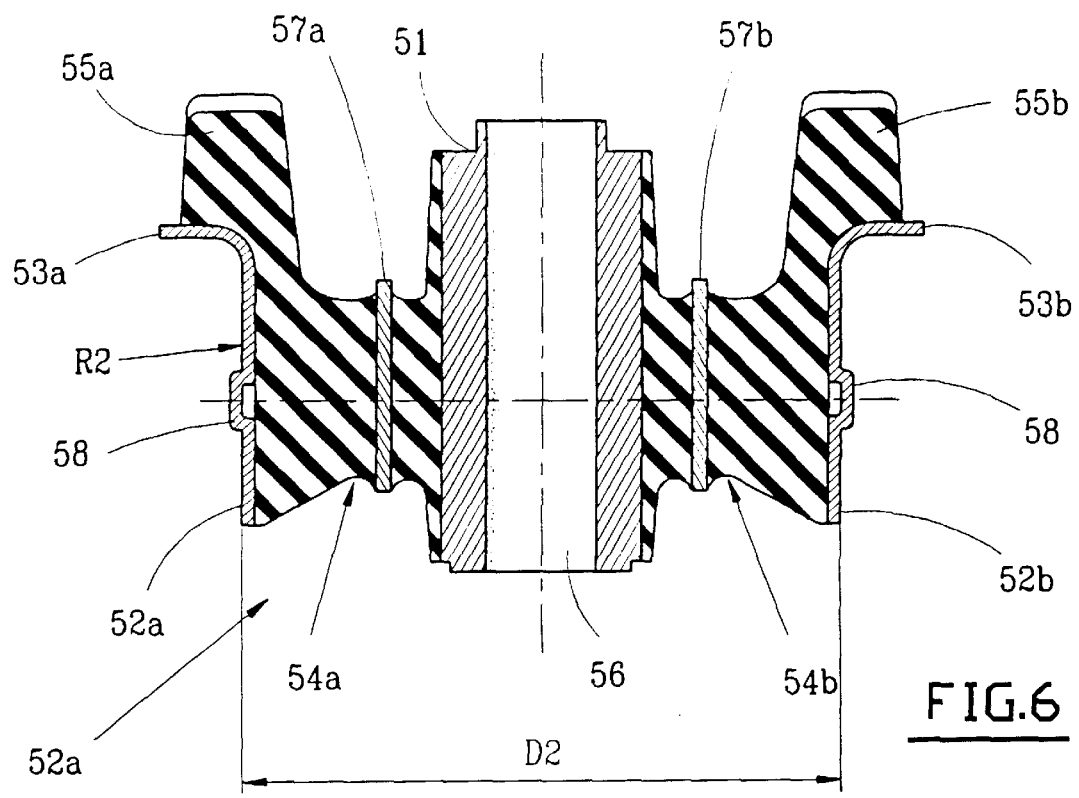
Figure 7:
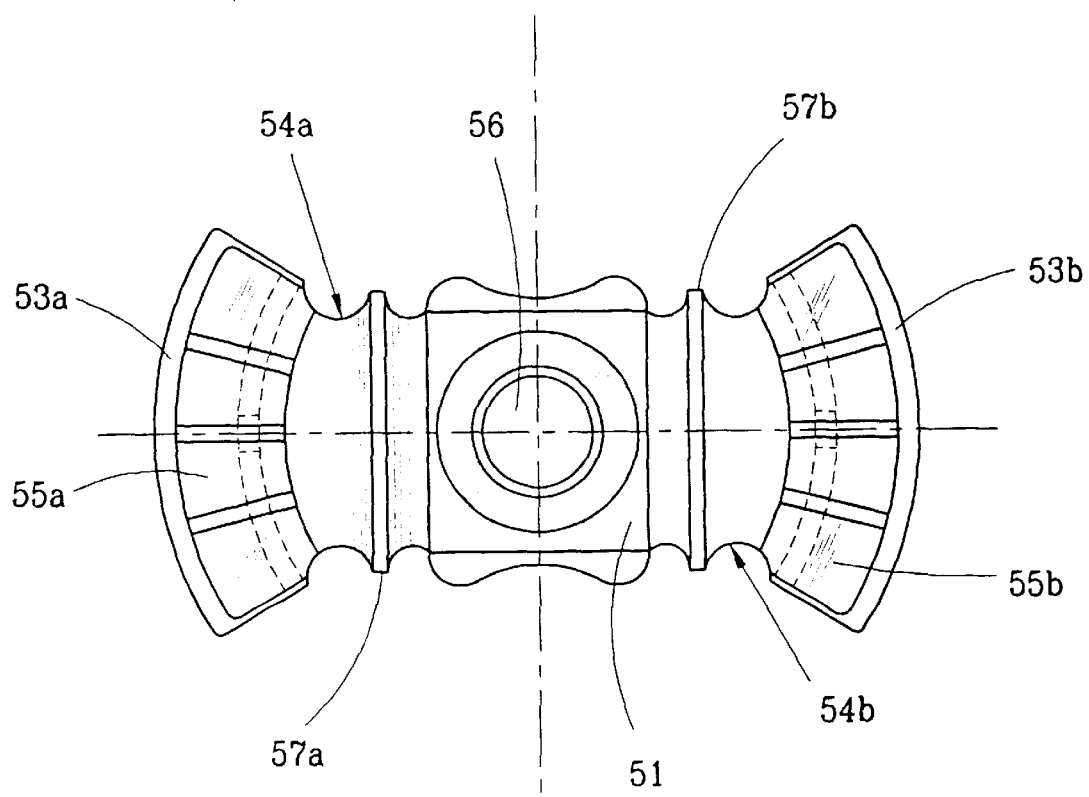
Figure 8:
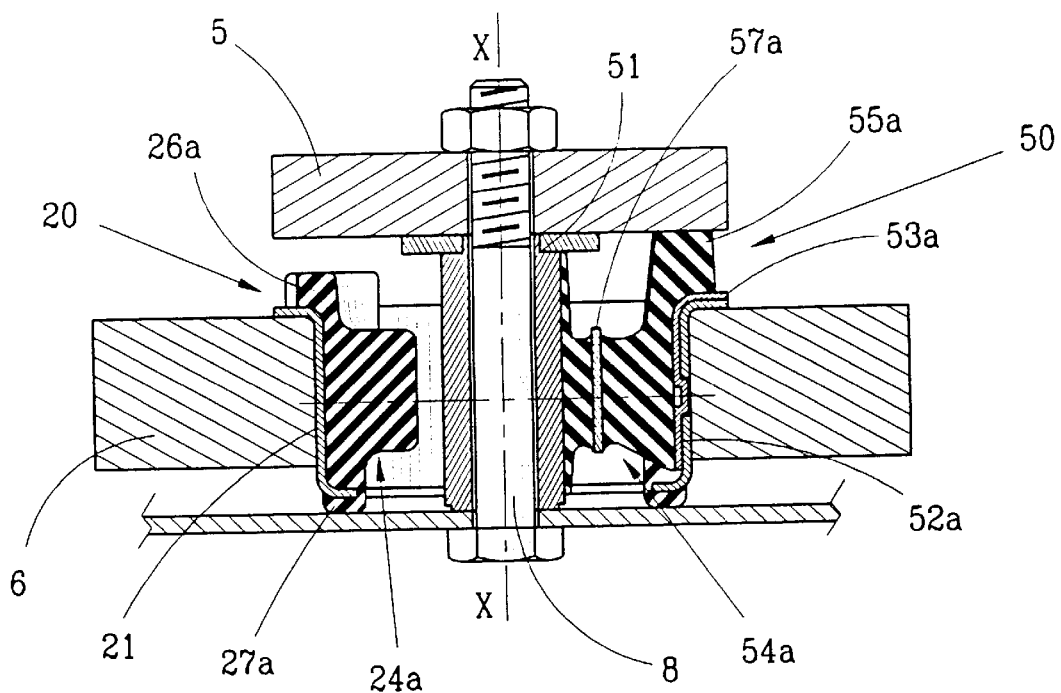

Further features and advantages of the invention will become clear in the course of the description which will follow, given by way of example and made with reference to the appended drawings, in which:

FIG. 1 is a diagrammatic side view illustrating the general principle of mounting a rear axle assembly relative to the body of a motor vehicle, FIG. 2 is a diagrammatic view from above of the elastic articulation in accordance with the invention, FIG. 3 is a view in section on the line 3—3 of FIG. 2, FIG. 4 is a view in longitudinal section of the damping element of the elastic articulation in accordance with the invention, FIG. 5 is a view of FIG. 4 from above, FIG. 6 is a view in longitudinal section of the filtering element of the elastic articulation in accordance with the invention, FIG. 7 is a view of FIG. 6 from above, FIG. 8 is a view identical to FIG. 3 showing the layout of the elastic articulation with a view to mounting the rear axle assembly.

FIG. 1 represents a motor vehicle rear wheel and axle assembly denoted overall by the reference 1, including, in particular, wheels 2 connected to a central beam 3 by lateral arms 4.

The central beam 3 is connected to the body 5 by a rear axle assembly cross member 6 with the interposition of two elastic articulations 10 in accordance with the invention and of two elastic links 11.

As represented in FIGS. 2 and 3, the elastic articulation 10 has a circular cylindrical overall shape and it is arranged so that its longitudinal axis X-X is perpendicular to the longitudinal direction of the vehicle.

The elastic articulation 10 comprises two independent elements, an element 20 for damping out the vertical and longitudinal deflections and an element 50 for filtering out the lower amplitudes, which is independent of and coaxial with the damping element 20.

It is possible for the elements 20 and 50 to move one with respect to the other.

As represented in FIGS. 3 to 5, the damping element 20 comprises an outer metal reinforcing member 21 forming a ring equipped with an upper flange 22 directed towards the outside of the ring 21 and with a lower flange 23 directed towards the inside of the said ring 21.

Two blocks of elastomeric material, respectively 24a and 24b are overmoulded and bonded onto the internal face of the flange 21 forming the outer reinforcing member.

As is clear from FIG. 5, each block 24a and 24b covers an opposite angular sector of the ring 21 and has a central mass 25a and 25b extended at its upper part by a pad 26a and 26b partially covering the upper flange 22 and at its lower part by a pad 27a and 27b partially covering the lower flange 23.

In this way, the central masses 25a and 25b of the blocks 24a and 24b pointing towards the inside of the ring 21 have the function of a radial stop while the upper pads 26a and 26b, each of which covers an opposite angular sector of the upper flange 22, have the function of an attack stop and the lower pads 27a and 27b, each of which covers an opposite angular sector of the lower flange 23, have the function of a relaxation stop.

The ring 21 forming the outer reinforcing member may, for example, be made of steel, and the elastomer of the blocks 24a and 24b of the damping element 20 consists of a synthetic rubber, such as polybutadiene for example.

The filtering element 50 represented in greater detail in FIGS. 6 and 7 is composed of a central metal core 51 and of two outer metal reinforcing members 52a and 52b respectively, linked to the central core 51 by two blocks of elastomeric material 54a and 54b respectively.

The two outer reinforcing members 52a and 52b have the shape of sectors on the outside, as FIG. 7 represents, and at their upper part include a collar 53a and 53b respectively.

Each block 54a and 54b at its upper part includes a filtering bearing stop 55a and 55b covering the corresponding collar 53a and 53b.

The central core 51 and the two reinforcing members 52a and 52b may, for example, be made of steel and the central core 51 is formed of a tube including an orifice 56 for the passage of a member for fastening the elastic articulation to the body 5 of the vehicle, as will be seen later.

The blocks 54a and 54b of elastomeric material may also each include a lamination 57a and 57b respectively, the object of which is to double the radial stiffness of these two blocks.

The outside radius R2 of each outer reinforcing member 52a and 52b of the filtering element 50 is equal to the inside radius RI of the outer reinforcing member 21 of the damping element 20.

The elastomer of the two blocks 54a and 54b of the filtering element 50 consists of a mixture comprising natural rubber and additives such as oil, carbon black or an antioxidant, for example.

The elastic articulation 10 is assembled as follows.

First of all, the absorbing element 20 is made so as to overmould the blocks 24a and 24b of elastomeric material inside the outer reinforcing member 21, and the filtering element 50 is made for overmoulding the blocks 54a and 54b of elastomeric material between the central core 51 and the two outer reinforcing members 52a and 52b.

Next, the filtering element 50 is fitted inside the damping element 20 so that the external faces of the reinforcing members 52a and 52b of the said filtering element press against the internal face of the reinforcing member 21 of the said absorbing element.

In this way the blocks 24a, 24b and 54a, 54b respectively of the absorbing element 20 and of the filtering element 50 are arranged alternately and at 90° to one another, as FIG. 2 represents.

The filtering element 50 is held inside the damping element 20 by positioning and locking means.

These positioning and locking means are formed by two diametrically opposite radial holes 28 made in the ring 21 of the filtering element 20 between the two blocks 25a and 25b (FIGS. 4 and 5) and by two diametrically opposite bumps 58 made on the external faces of the outer reinforcing members 52a and 52b of the damping element 50 (FIG. 6).

When the filtering element 50 is fitted inside the damping element 20, the two bumps 58 penetrate the two holes 28 and position and lock the said damping element within the said filtering element.

The reverse solution may be envisaged, by providing inward-pointing bosses on the external reinforcing member 21 of the damping element and holes on the outer reinforcing members 54a and 54b of the filtering element.

Furthermore, the outside diameter D2 (FIG. 6) defined by the two reinforcing members 52a and 52b of the filtering element 50 is slightly greater than the inside diameter D1 (FIG. 5) of the ring 21 of the damping element 20 so as to obtain a precompression of the two blocks 54a and 54b of the filtering element 50 when the said filtering element 50 is fitted tightly inside the damping element 20.

As FIG. 8 represents, the external reinforcing member 21 of the damping element 20 is fitted tightly into the cross-member 6 of the rear axle assembly and the outer reinforcing members 52a and 52b of the filtering element 50 are secured to the body 5 of the vehicle via a fastening member 8 passing through the orifice 56 of the central core 51.

An initial preload may be applied to the stops 55a and 55b of the filtering element 50.

For small movements or low-amplitude vibration, only the blocks 54a and 54b of elastomeric material of the filtering element 50 are stressed.

There is no transfer of load to the body of the vehicle to be isolated.

As the vertical amplitude increases, the attack stops consisting of the pads 26a and 26b of the damping element 20 or the relaxation stops consisting of the pads 27a and 27b of the said damping element 20 act and considerably reduce the phenomenon of longitudinal "sway" or vertical "beating" a on the vehicle.

The elastic articulation according to the invention displays the advantage of being able to obtain a substantial gain as regards the acoustic and vibrational comfort.

What happens is that the elastomers forming the blocks of the damping element and of the filtering element and corresponding to the two desired functions are different from the molecular point of view and have different hardnesses or different modulus which make it possible more easily to differentiate the desired behaviours and flexibilities than is the case when a single elastomer is used.

I claim:

1. Elastic articulation for mounting a motor vehicle wheel and axle assembly, comprising:
   a damping element for damping out vertical and longitudinal deflections and a filtering element for filtering out low amplitudes, the filtering element being independent of and coaxial with the damping element, and the filtering and damping elements being capable of moving one with respect to the other, the damping element comprising an external metal reinforcing member forming a ring equipped with an upper flange directed towards an outside of the ring and with a lower flange directed towards an inside of the ring, a first two blocks of elastomeric material fixed within said ring, each said block covering an opposite angular sector of said ring, each block including a central mass extended at its upper part by a pad partially covering the upper flange and at its lower part by a pad partially covering the lower flange, the filtering element comprising a central metal core and two opposing outer metal reinforcing members, each said reinforcing member being sector-shaped and including a collar at an upper part thereof, said core and said reinforcing members being linked together by a second two blocks of elastomeric material, each of which includes a bearing stop covering the collar of the corresponding reinforcing member.

2. Elastic articulation according to claim 1, wherein the damping element and the filtering element are fitted one inside the other and each include two opposing and symmetrically disposed blocks of elastomeric material, the damping element blocks being arranged alternately with and at 90° to the filtering element blocks.

3. Elastic articulation according to claim 2, wherein the first two blocks of the damping element are formed from a first elastomer, the second two blocks of the filtering element are formed from a second elastomer, and the first elastomer has a different rigidity than the second elastomer.

4. Elastic articulation according to claim 3, wherein the elastomer of the first two blocks of the damping element consists of a synthetic rubber.

5. Elastic articulation according to claim 3, wherein the elastomer of the first two blocks of the filtering element consists of a mixture comprising natural rubber and additives.

6. Elastic articulation according to claim 1, wherein the external metal reinforcing member is made of steel.

7. Elastic articulation according to claim 1, wherein an outside diameter determined by the two reinforcing members of the filtering element is slightly greater than an inside diameter of the ring of the damping element in order to obtain a precompression of the two blocks of elastomeric material of the filtering element.

8. Elastic articulation according to claim 1, wherein the central metal core and the two reinforcing members are made of steel.

9. Elastic articulation according to claim 1, wherein the central metal core includes a tubular member.

10. Elastic articulation according to claim 1, wherein each of the elastomeric material blocks of the filtering element includes an intermediate lamination means for increasing the radial stiffness of the blocks.

11. Elastic articulation according to claim 1, further including means for positioning and for locking the filtering element within the damping element.

12. Elastic articulation according to claim 11, wherein the positioning and locking means is formed by two diametrically opposite radial holes formed in the ring of the filtering element and by two diametrically opposite bumps formed on external faces of the outer reinforcing members of the damping element, the two bumps being intended to penetrate the two holes when the filtering element is fitted inside the damping element.

* * * * *